(12) United States Patent
Haldiman

(10) Patent No.: US 6,802,614 B2
(45) Date of Patent: Oct. 12, 2004

(54) SYSTEM, METHOD AND APPARATUS FOR AMBIENT VIDEO PROJECTION

(76) Inventor: Robert C. Haldiman, 9607 D Rd., Columbia, IL (US) 62236

( * ) Notice: Subject to any disclaimer, the term of this patent is extended or adjusted under 35 U.S.C. 154(b) by 11 days.

(21) Appl. No.: 10/306,042

(22) Filed: Nov. 27, 2002

(65) Prior Publication Data

US 2003/0098957 A1 May 29, 2003

Related U.S. Application Data

(60) Provisional application No. 60/333,847, filed on Nov. 28, 2001.

(51) Int. Cl.[7] .............................................. G03B 21/14
(52) U.S. Cl. ............................ 353/69; 353/30; 353/70; 353/94
(58) Field of Search ............................. 353/69, 70, 94, 353/30

(56) References Cited

U.S. PATENT DOCUMENTS 5,964,064 A * 10/1999 Goddard et al. ................. 52/8
6,017,123 A * 1/2000 Bleha et al. .................... 353/30
6,367,933 B1 * 4/2002 Chen et al. ..................... 353/69
6,367,934 B1 * 4/2002 Salesky et al. ................. 353/74
6,513,938 B2 * 2/2003 Kubota et al. .................. 353/94
6,520,646 B2 * 2/2003 Rodriguez et al. ............. 353/69

* cited by examiner

Primary Examiner—Russell Adams
Assistant Examiner—Michael Dalakis
(74) Attorney, Agent, or Firm—Robert C. Haldiman

(57) ABSTRACT

A system for front projection of a continuous image onto at least two non-coplanar viewing surfaces includes a light source, an image source and a projection lens assembly. The light source, image source and projection lens assembly are disposed within a housing to project an image on a first viewing surface and at least one other viewing surface. An image continuity component has a first oblique projection compensator, at least one other oblique projection compensator and the oblique projection compensators are coordinated to project complimentary image portions in a continuous image.

19 Claims, 12 Drawing Sheets

SYSTEM, METHOD AND APPARATUS FOR AMBIENT VIDEO PROJECTION

CROSS-REFERENCE TO RELATED APPLICATIONS

This application claims priority to Provisional Application No. 60/333,847, filed Nov. 28, 2001.

STATEMENT REGARDING FEDERALLY SPONSORED RESEARCH OR DEVELOPMENT

Not Applicable

BACKGROUND OF THE INVENTION

1. Field of the Invention

The present invention is in the field of video projection.

2. Related Art

It is known to project video signals onto flat screens and walls. It is also known to project video signals onto broad, curved screens, such as the IMAX theater system.

It is not known to project continuous video images onto adjacent walls or flat screens joined at corners. Home, office and theater projection is currently limited to single contiguous surfaces, because images cannot be projected onto adjacent walls or onto walls and ceilings without distortion. There is a need for coordinated projection of video or digitized film simultaneously onto multiple surfaces joined at corners.

Digital manipulation of video and still images is known. Adjusting distortion caused by the angle of projection is known currently in the form of keystone correction. Such image adjustment allows images to be projected from a projection angle other than normal to a flat surface and still appear to a viewer to be undistorted and in their proper perspective. Still image digital manipulation of perspective is also known, in the form of skewing and distorting.

It is not known to project images onto two adjacent walls simultaneously and correct the perspective so that the images appear to a viewer to be undistorted and in their proper perspective, despite the corner dividing the image.

There is a need in the art for projection adaptable to various room configurations with digital perspective correction applied through wide angle optics.

SUMMARY OF THE INVENTION

The present invention combines wide angle optics with digital distortion control technology in a novel manner useful for projecting continuous images onto multiple surfaces such as adjacent walls and ceilings, simultaneously. Very wide angle projection optics are used to project images onto multiple walls. Projection distortion is corrected digitally.

Prior "keystone" digital distortion correcting techniques were only applied to vertically compress one side of an image projected onto a surface from a projector that was not perpendicular to the surface, in order that the final image looked square. The present invention distorts the middle of a projected image to correct projection into corners between walls so that a viewer perceives the image without distortion. An undistorted continuous image projected simultaneously onto two or more walls, with or without projecting onto the ceiling, will give an appealing cornerless, immersive, ambient sensation surrounding a viewer.

The system of the present invention includes 360 degree, hemispherical image capture.

Applications include live theater sets, restaurant and night club background, educational viewing, business presentations, interior decorating, gaming and home entertainment. The present invention can project displays onto any surface.

The present invention may be powered by either AC or DC sources. The present invention projects with any video standard, including but not limited to VGA, SVGA, XGA or UXGA. The present invention can display bit maps either from conventional analog to digital conversion, digital video or recently developing Digital Video Interfaces.

Further features and advantages of the present invention, as well as the structure and operation of various embodiments of the present invention, are described in detail below with reference to the accompanying drawings.

DETAILED DESCRIPTION

Digital keystone correction is known. Standard projectors are intended to be positioned perpendicular to the screen or wall onto which the image is projected. If the projector is misplaced such that it is offset from normal to the wall, the image appears as a distorted trapezoid, instead of the desired symmetrical rectangle. The image appears in a "keystone" shape.

Figure 1:
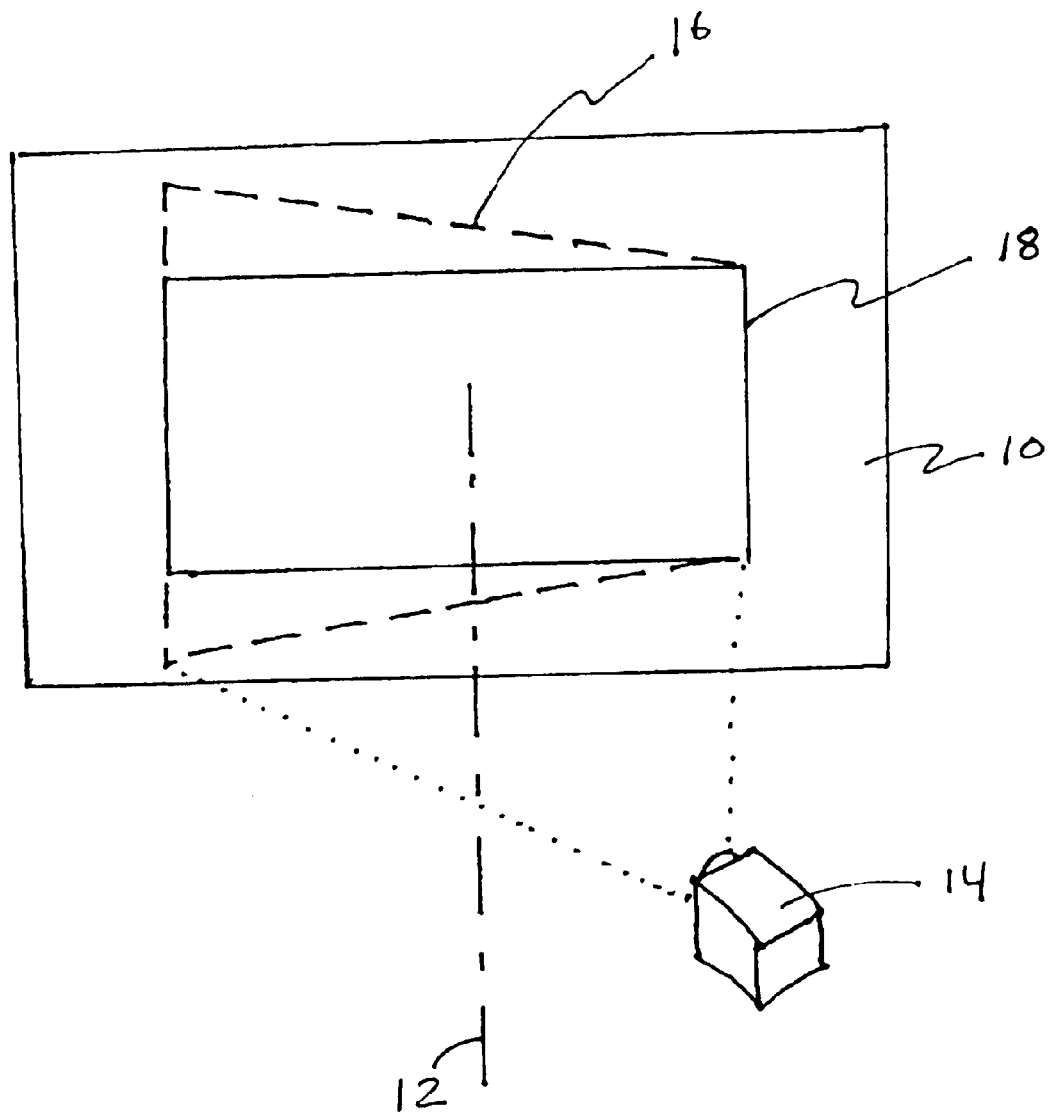
FIG. 1 is a schematic view of a prior art projector.

Keystone correction compensates for misalignment distortion by intentionally projecting a non-rectangular trapezoid that is the mirror image of the keystone distorted trapezoid on the screen. In FIG. 1 dashed line 12 is normal to wall 10. Projector 14 is offset from normal line 12. Dashed line 16 represents the non-rectangular trapezoid as the distorted image would appear to a viewer if it were not corrected. Because the projected light travels farther to the left side of the wall, it spreads more and consequently the left side is larger than the right. Of course the content of the image as well as its perimeter is distorted.

Figure 2:
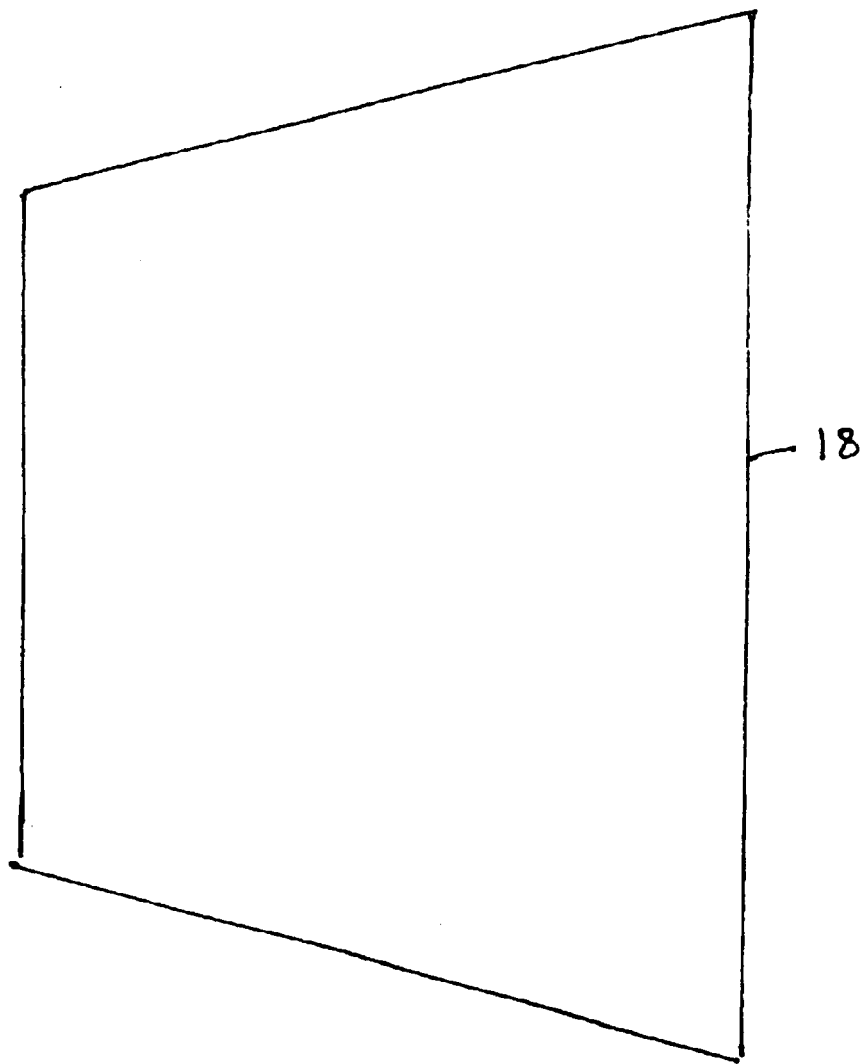
FIG. 2 is a schematic view of a prior art projection distortion corrected image.

FIG. 2 depicts the image actually projected by a keystone correcting projector. Solid line 18 is the mirror image trapezoid projected for correction. On FIG. 1 solid line 18 is the corrected projection as seen by a viewer. Both the perimeter and content appear in their proper perspective. Whereas analog film projectors correct for keystoning by physically moving the projector, modern projectors may also digitally correct video images by digitally generating the compensating trapezoid. The trapezoid is formed by compressing pixel columns on one side of the image, expanding pixel columns on the other side of the image, or both. Pixel column compression is often achieved by software that selectively omits pixels while preserving the image content. Pixel column expansion is achieved by interpolating extra pixels, also in a way that preserves the image. Such video processing is commonly available, such as in the InFocus™ line of projectors.

Figure 3:
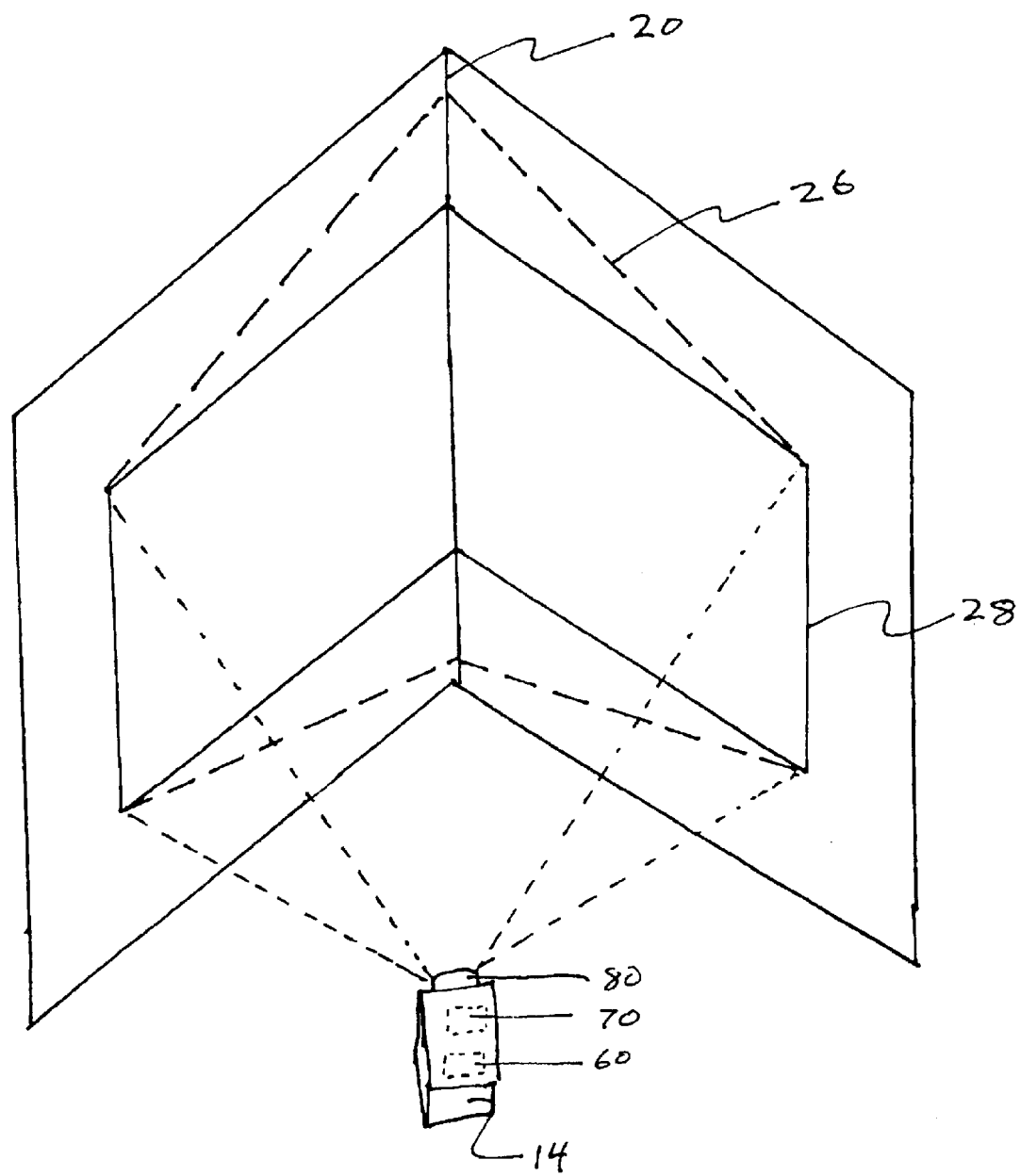
FIG. 3 is a schematic view of the projector of the present invention.
Figure 4:
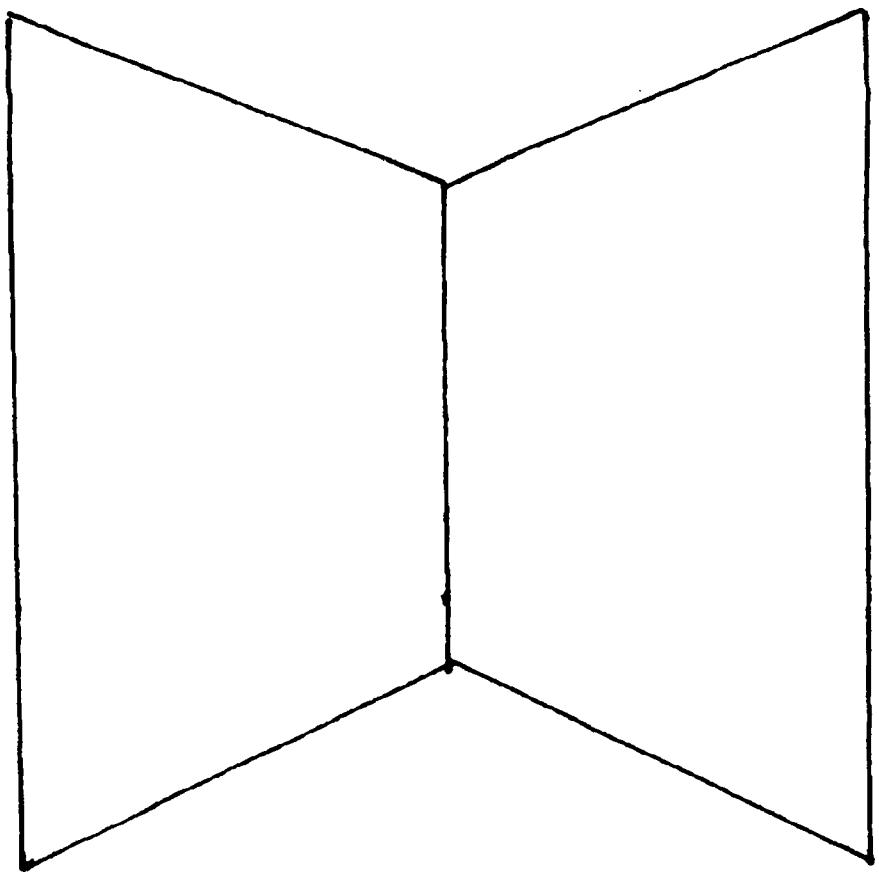
FIG. 4 is a schematic view of a projection distortion corrected image of the present invention.

The present invention projects portions of an image as complimentary, coordinated trapezoids. FIG. 3 shows the projector 14 projecting into a corner 20 junction between a first and second viewing surfaces, for example walls or screens. Dashed line 26 shows the distorted image that would be seen without correction. The greater distance from the projector 14 to the corner 20 creates a taller image than that seen on the sides of the image, which appear on the portions of the wall closer to the projector 14. FIG. 4 shows the digitally applied corner correction as it would appear if projected onto a flat surface. It has a vertical waist, creating a "bow tie" shape. The degree of correction is calculated and, in some embodiments, adjustable, to correspond to the degree of dispersion or spread of the light being projected into the corner. Thus, when projected into corner 20, the corrected image appears as a right rectangle 28. More importantly, the content of the image is also distorted if projected without correction, and also appears to be normal with correction. The corner becomes imperceptible to a viewer of corrected projection.

Each trapezoidal image portion will have image areas that are projected farther and areas that are projected on nearer portions of the viewing surfaces. Image areas are comprised of continuous image content, with correction being graduated from the image areas projected on the nearer viewing surface area to the image areas projected on the farther viewing surface portion.

Figure 5:
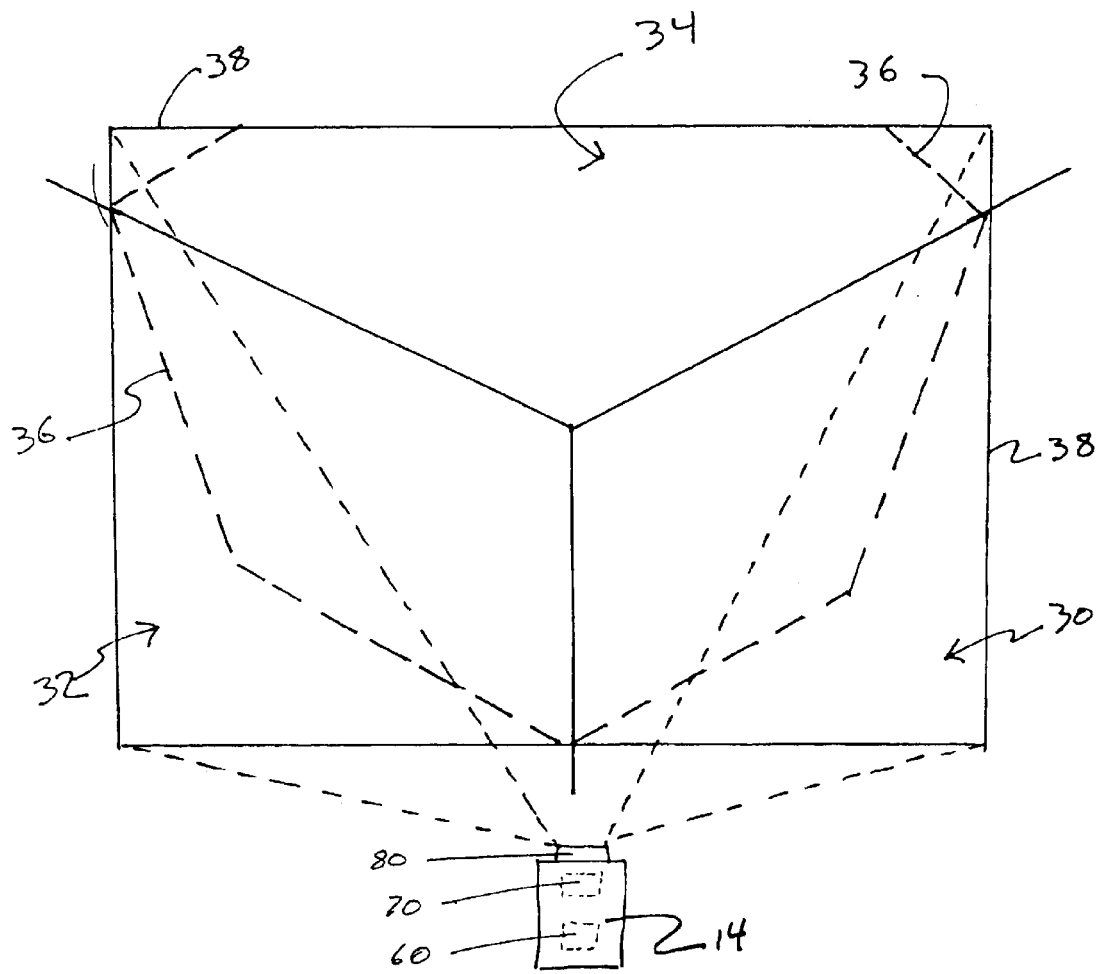
FIG. 5 is a schematic view of another embodiment of the projector of the present invention.
Figure 6:
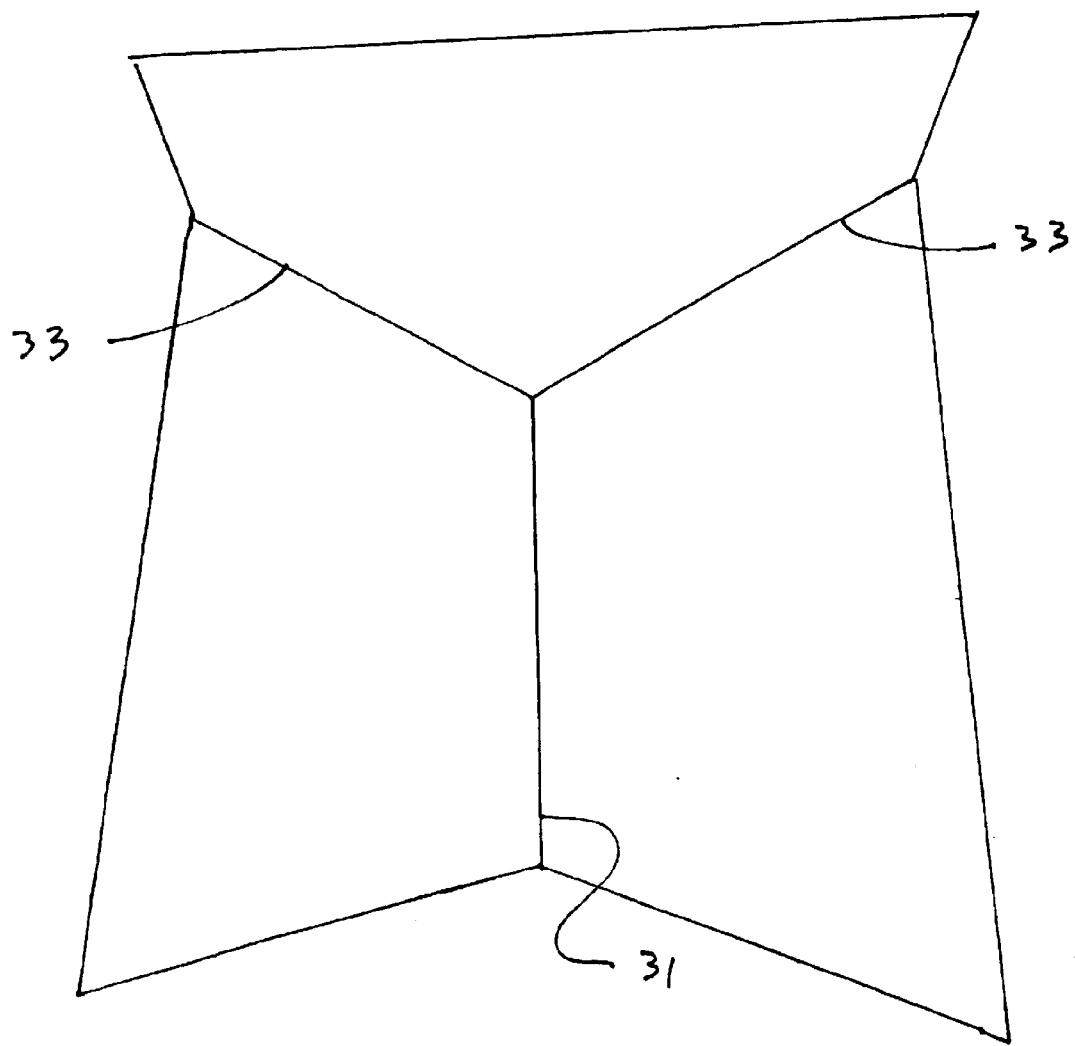
FIG. 6 is a schematic view of another embodiment of a projection distortion corrected image of the present invention.

FIG. 5 shows a more complex embodiment of the present invention which includes projection onto a ceiling. Projector 14 is pointed to project upward as well as to the sides, so that the image appears on first wall 30, second wall 32 and ceiling 34. Once again, dashed line 36 represents the distorted, uncorrected image, and solid line 38 represents the corrected image. FIG. 6 shows the digitally applied corner correction as it would appear if projected onto a flat surface. It has a vertical waist, 31, and two more demarcation lines 33 corresponding to the corners between each wall, 30 and 32 and the ceiling 34. Again, when projected into the corner, the corrected image appears as a right rectangle 38. Distortion of the content of the image is also corrected, and also appears to be normal. The corners become imperceptible to a viewer. As will be immediately apparent to those of skill in the graphics programming art, fitting the digital correction to the particular placement of a projector in a particular room needs only the incorporation of adjustment parameters similar to those already known in single surface keystone correction. It is contemplated that the projectors of the present invention will have adjustable corner correction. Further perspective manipulation techniques are known and employable with the present invention. Pixel row and column translation, scaling and rotation techniques use known matrix transforms and vector algebra, as described in Digital Image Processing by William K. Pratt, $2^{nd}$ Edition, John-Wiley & Sons, Inc., Chapter 14, which is incorporated herein by reference.

Figure 7:
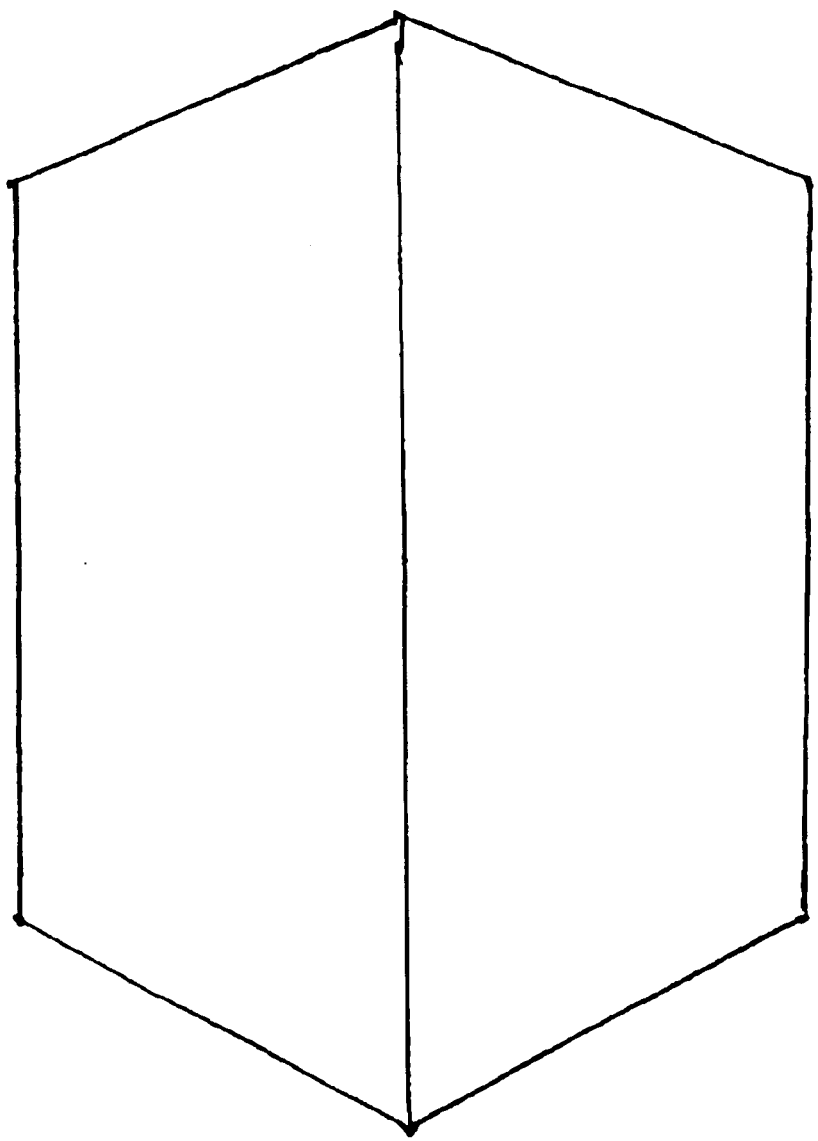
FIG. 7 is a schematic view of another embodiment of a projection distortion corrected image of the present invention.

In a similar, converse manner, the correction can be reversed to project onto a corner that is convex to the projector, rather than the corners concave to the projector, described above. FIG. 7 depicts the correction available for projecting on convex corners.

Figure 8:
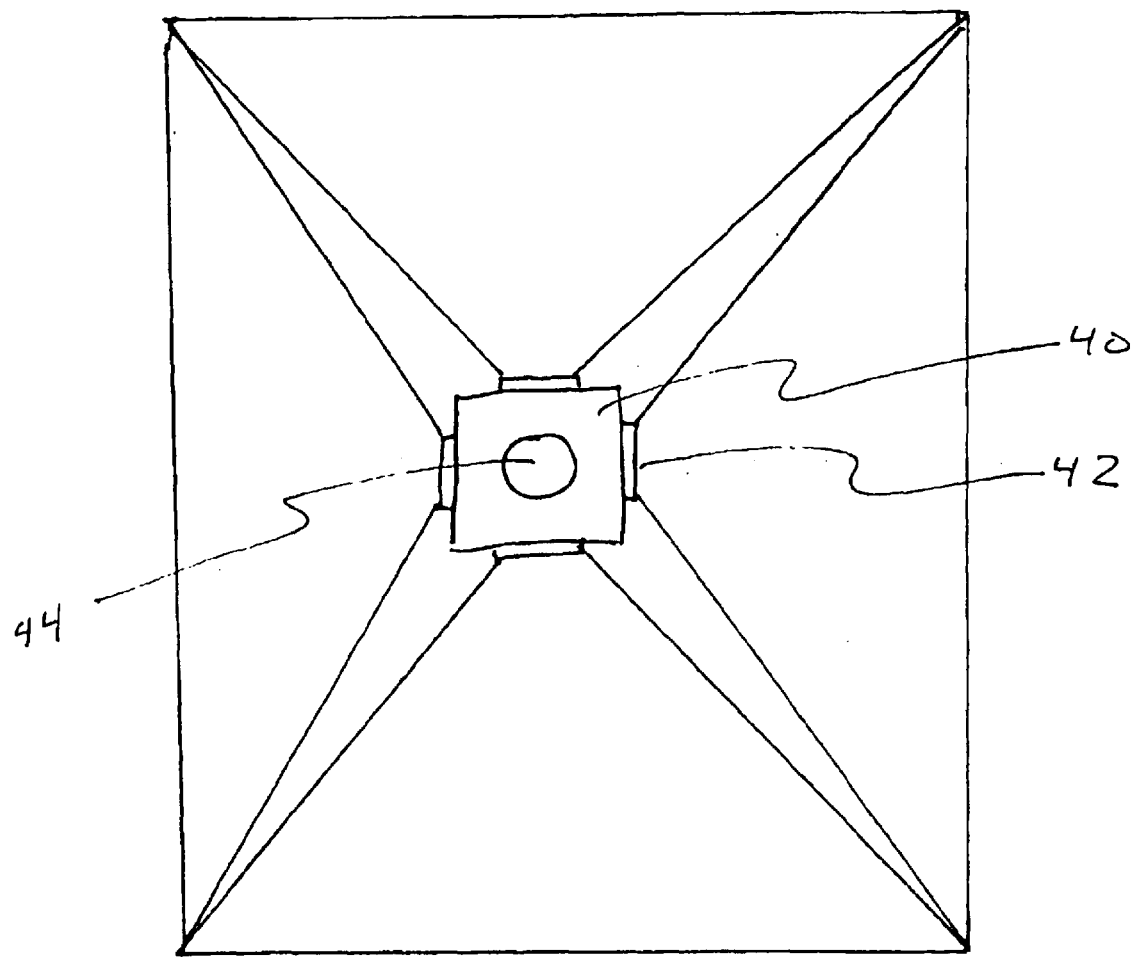
FIG. 8 is a schematic view of another embodiment of the projector of the present invention.

FIG. 8 illustrates a full room projection embodiment of the present invention. Projector 40 has 4 side lenses, 42 and a single ceiling lens 44. A single image recording of four or five simultaneously captured, coordinated recorded images are projected onto each wall by the side lenses 42, and onto the ceiling by the ceiling lens 44. While achieving the desired surrounding image projection, this embodiment has the disadvantage of placing room occupants between the projector and the projected images, leading to shadows and the bright light from the projector shining in the viewer's eyes.

Figure 9:
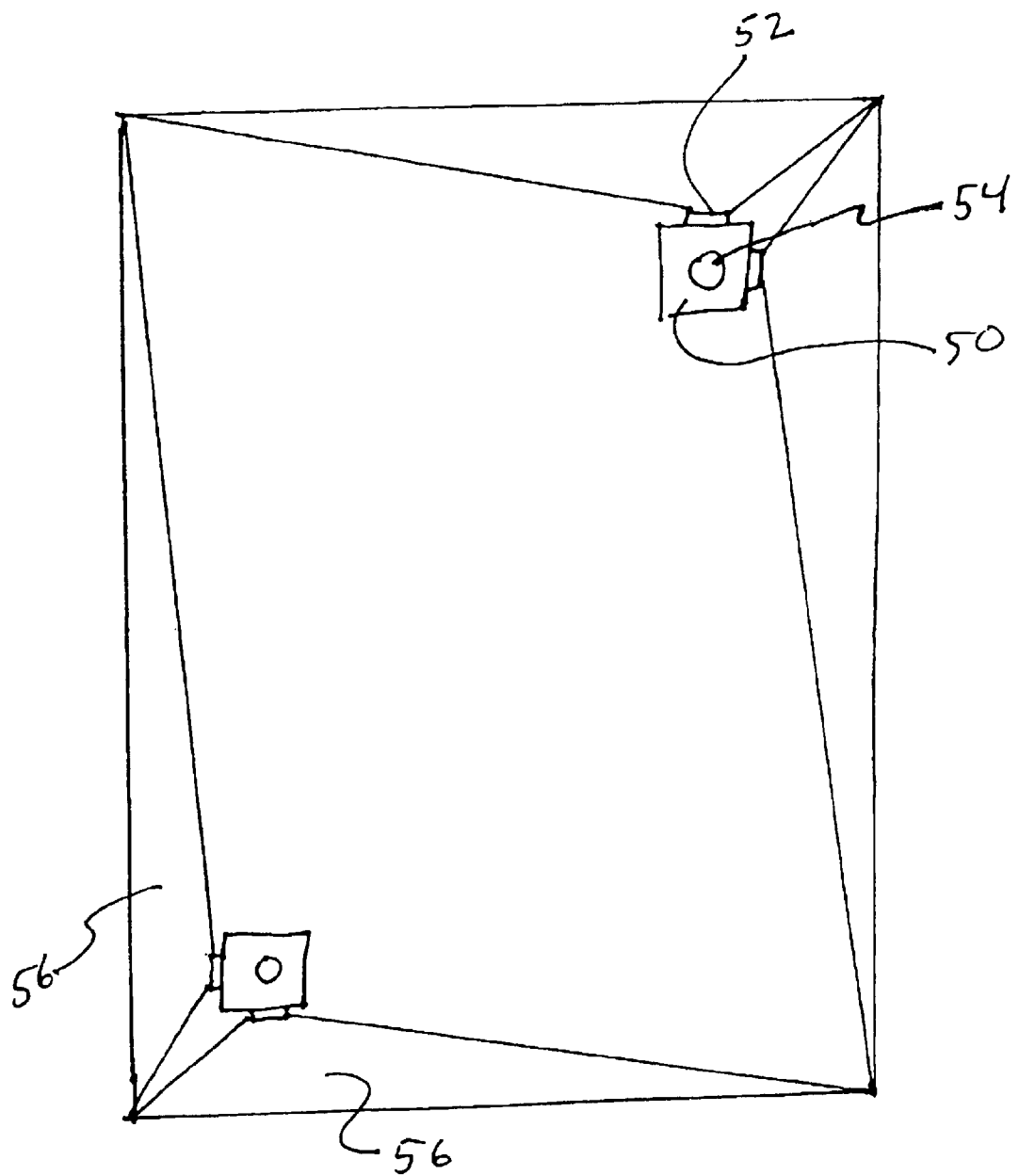
FIG. 9 is a schematic view of another embodiment of the projector of the present invention.

FIG. 9 depicts an embodiment addressing these issues. Two projectors 50 are placed in opposing corners of the room. Wide angle projection is used to project an image the length of each wall from each of side lenses 52. Top lens 54 projects onto the ceiling. The top lenses 54 of the two projectors 50 are adjusted to project the image halfway across the ceiling, on a diagonal in most rectangular rooms. Projectors 50 are on stands, and set out from the wall a small distance, similar to the placement of stereo speakers. In order to maximize useful room space that does not have projected light crossing it, the side projection is maximized. The present invention may incorporate known techniques for aspect ratio manipulation, such as those used to convert 16:9 film aspect ratios to 4:3 television ratios. Areas that have projected light crossing them are indicated at 56.

Various projector configurations are contemplated to be within the scope of the system of the present invention, including one, two, three, four, five or more lenses, any of which may combine optical projection parameters with digital distortion and corner correction.

Capture of images to be projected is contemplated to be within the scope of the system of the present invention. Of course, conventionally produced video or film images may be projected according to the system of the present invention. Very wide angle film and video image capture equipment and techniques are known, as for example by IMAX™, the behere system and Fullview™. Hence single wide angle or 360 degree images are available for projection. However, the distortion correction to be applied may be optimally executed with complementary image capture methods and apparatuses. Camera lenses may be configured as the projector lenses are. Accordingly, a camera can have five lenses, just as the projector of FIG. 8 has five lenses. Standard video camera lenses are available with fields of view up to 80 plus degrees, and the behere system allows 360 degree video capture, or nearly 360 degree hemispheric image may be captured for projection by proper configuration of conventional equipment.

Figure 10:
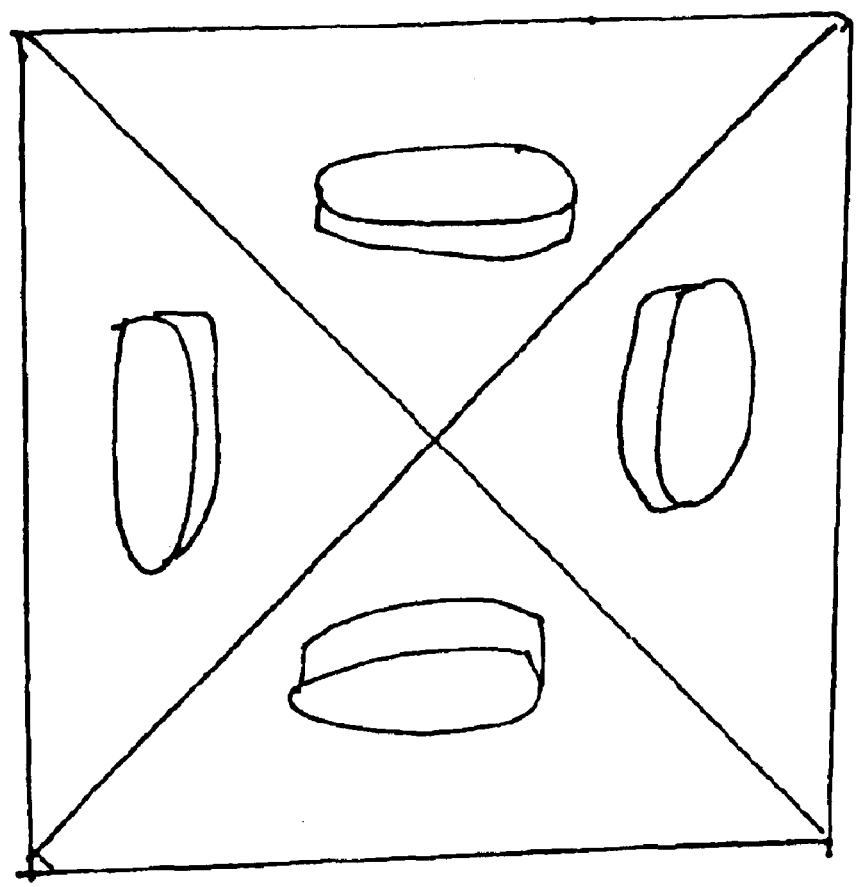
FIG. 10 is a top view of an embodiment of the camera of the present invention.
Figure 11:
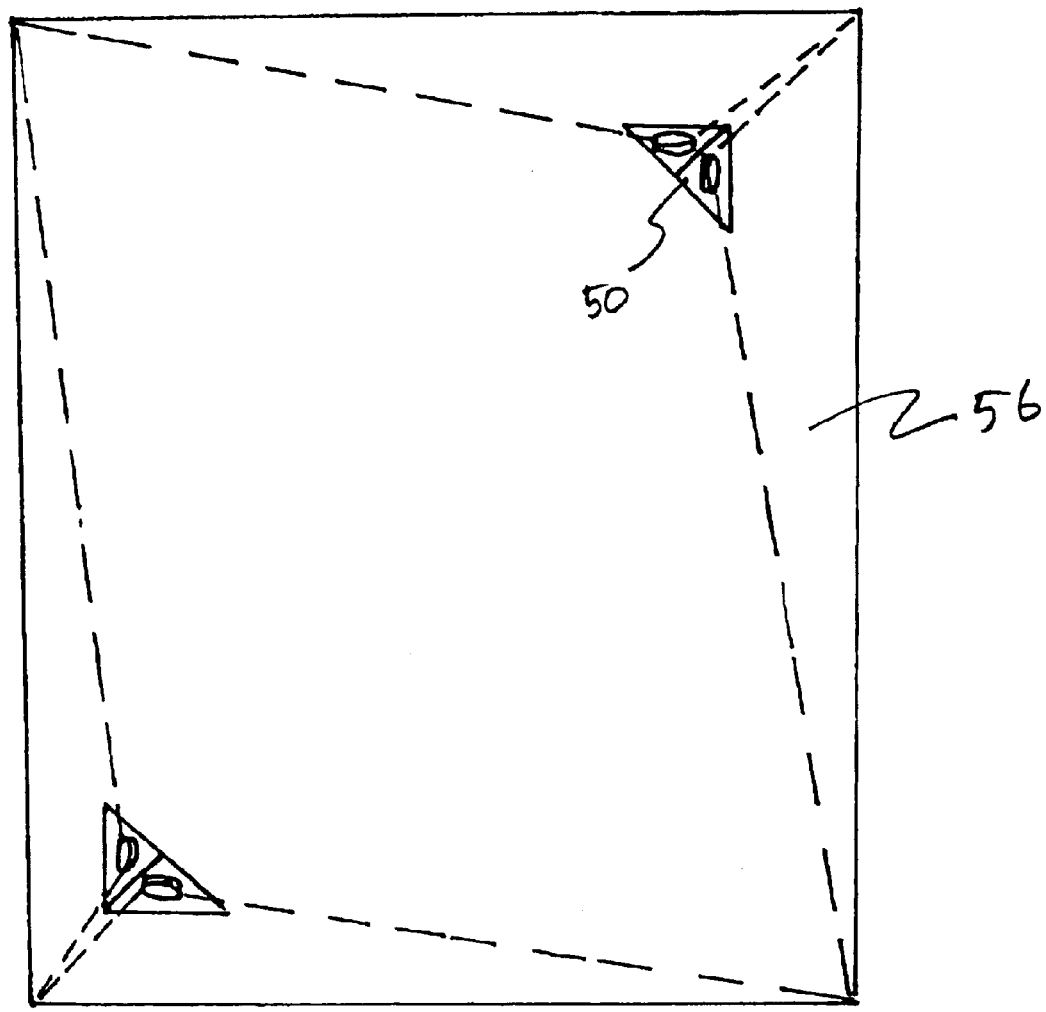
FIG. 11 is a schematic view of another embodiment of the projector of the present invention.

Fewer lenses may be used by incorporating corner correction of the images as described above. FIG. 10 shows a four lens camera configuration. The camera body is pyramid shaped, with the apex upward. A lens is on each of the four sides of the pyramid. FIG. 11 is the projector configuration corresponding to the camera of FIG. 10. Two pyramidal sides are on each projector. Each side lens is generally oriented towards a wall. Each lens is also partially oriented towards the ceiling. Digital distortion correction is used to coordinate the projector to the individual room and eliminate corner distortion. The image is projected with "waist" lines or demarcation lines as described above, which are custom alignable by the user to fit the corners of a viewing room.

Distortion correction is also contemplated to include correction of wide angle lens distortion. It is well known to photographers that widening the lens angle captures a broader field of view, but also distorts the image captured. "Fish eye" lenses can photograph 360 degree hemispheres with one lens, but distortion is extreme. Such an image can be digitally corrected by applying polynomial warping techniques to project images with compensating "pincushion" or "barrel" distortions. It is contemplated that the present invention will optimize image capture and projection quality by using camera lenses that are wide angle, but not as wide as fish eye lenses, and likewise using projector lenses of similar width.

Challenges to this offset, oblique projection system include light intensity, resolution, and focus. As light propagates through space it disburses. As a result, an image that is bright, sharp and clear when projected on a near surface will, when projected onto a farther surface, appear less bright, less sharp and out of focus. A single image projected on an angled surface may appear brighter at the closer portion of the surface, and dimmer at the farther portion. Similarly, the farther portion will lose focus and resolution as compared to the nearer portion. The solutions to these challenges are presented below.

Brightness

Increasing brightness is simply achieved by projecting more light. Intensity must be increased in the image area to be projected on the farther viewing surface areas. Digital micromirror devices (DMD) 60 are already designed to represent brighter and dimmer portions of an image by varying the length of time they reflect the light corresponding to that image portion. The mirrors reflect light from a light source through a projection lens. Brightness is increased by reflecting the light for a longer period of time and decreased by shortening the time of reflection.

To represent the same brightness at a farther portion of a projected image as at a nearer portion, more light must be projected. Hence, the most direct solution to the loss of brightness across an angled image projection is to simply have the micro mirrors corresponding to the farther portion of the image reflect light for a longer period of time. This may be achieved through programming with known software techniques. Moreover, color saturation, which is reproduced according to digital RGB or CyMY data, may be varied to correspond to projection distance or "throw."

Additionally, it is a necessary feature of DMD design that the light source and the projection lens cannot both be normal to the DMD, which is the image source. One or both of them must be offset from normal. With conventional DMD projectors, digital and component assembly are designed to correct for variations in light intensity and corresponding resolution variations so that intensity and resolution are uniformly projected onto a screen normal to the projection lens assembly. Hence part of a direct solution is to omit these correction modalities in favor of taking advantage of the nonuniformity of intensity and resolution in the conventional DMD configuration by simply orienting the more intense, higher resolution areas of the images so that they are projected towards the farther areas of the viewing surfaces.

Another direct solution is to vary the intensity of the source light. A strobing light source coordinated with the DMD cycle time can direct more intense light to the DMD array when those mirrors corresponding to the portions of the image to be projected a greater distance are "on" (that is, reflecting light into the projection lens). Alternatively, different source lights may be directed at different segments of the DMD array, with the brighter source lights being directed onto the mirrors corresponding to the portions of the image to be projected a greater distance. Another alternative is to use a single source light with varying intensity, as for example a toroid.

Light may be varied with the internal shaping lens of the DMD device. In DMD devices, light from a source is focused onto the micromirror array by a "shaping lens." Altering the light bending characteristics of the shaping lens according to known optics methods can direct greater intensity onto the mirrors corresponding to the portions of the image to be projected a greater distance. Homogenizers comprised of an array of small lenses are sometimes used to manipulate light from a light source. Usually the manipulation is designed to normalize source sight into an even field, but the known techniques can just as well be used to vary source light intensity, as with a variable or partial homogenizer. Another component sometimes interposed between a light source and image source (such as a DMD or, more conventionally, a film gate) is a light bar. Light bars collimate light from a source by internal reflection and direct the uniform rays to the image source. Generally, a light bar of parallel sides emits a uniform beam. Therefor, known light bar technology can be modified to emit a weighted or non-uniform beam by using non-parallel sides. It is also known to vary the refractive index of the material of which the light bar is made. Usually the variance is symmetrical and used create a lensing effect, as with fiber optic medical scopes. The same techniques can be modified to direct a non-uniform beam of light to the image source in the present invention. Additionally, it is known to manipulate source light beams with a gate interposed before the image source, thus offsetting the beam and thereby varying its intensity.

Light sources are commonly augmented by reflectors. Known techniques are conventionally used to shine a uniformly intense beam of source light on the image source. Source "envelopes" are typically elliptical or parabaloid. However, spherical or asymmetrical ellipses or parabolas are available to focus a source beam onto the DMD or other image source that is more intense on the areas to be projected farther and less intense on the areas to be more nearly projected.

Any of these light intensity controlling components, 70, may be used. A practical solution may well involve a combination of the above techniques.

Resolution

Figure 12:
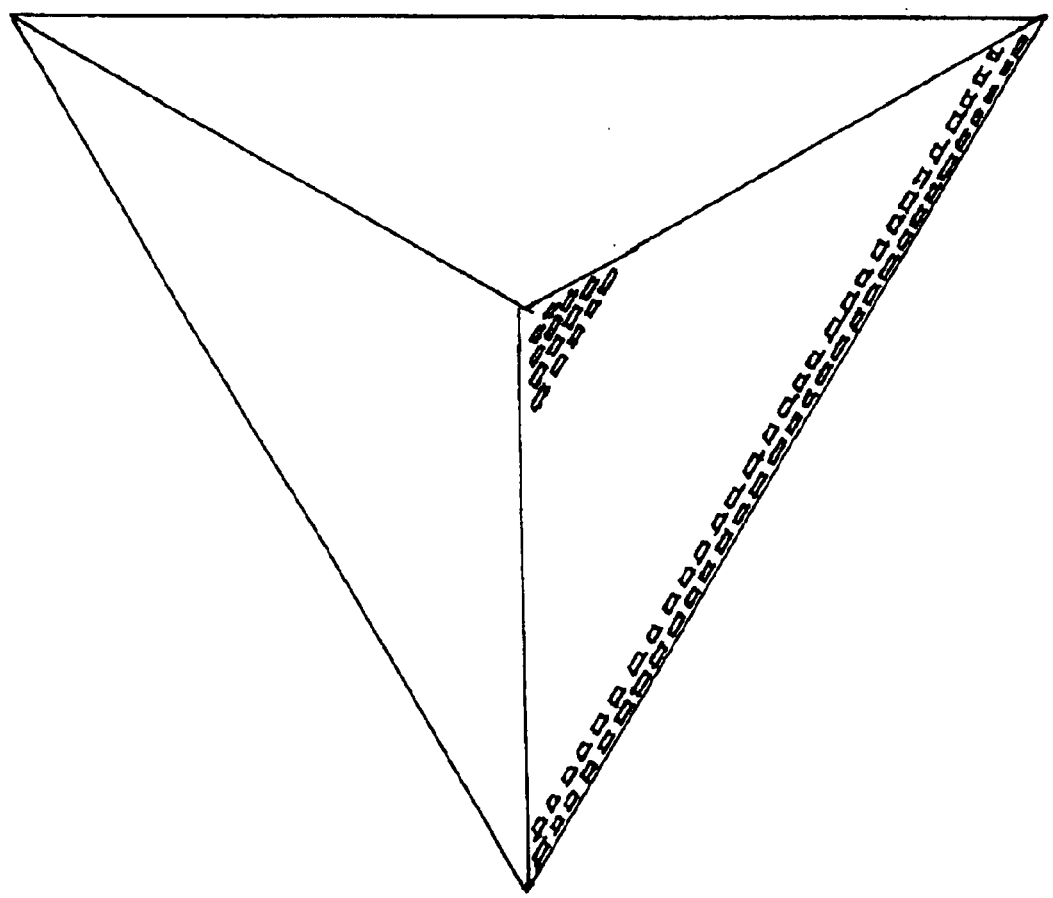
FIG. 12 is a schematic view of a triangular micromirror device.

Resolution equalization across an image projected onto an angled surface may be achieved in at least two ways. In either case, more pixels ("voxels") must be projected onto the portions of the image that are projected a greater distance. Accordingly, an asymmetrical micromirror array may be used to do so, FIG. 12. The array is arranged with more mirrors per unit surface area on that portion of the array that projects its portion of the image farthest. In the case of a rectangular array, there would be more mirrors per millimeter in the row of mirrors reflecting the border of the image to the farthest edge of the viewing screen or wall, and fewer mirrors per millimeter in the row of mirrors reflecting the border of the image to the nearest edge of the viewing screen or wall. The rows in between the two edge rows would each have a graduated number of mirrors to smoothly transition the resolution across the image. The final image projected would appear to a viewer as uniformly sharp.

Alternative geometries are possible. A circular array can be made for either projecting from a near corner position, as in FIG. 11, or a corner distant position, as in FIG. 3. In the near corner configuration, the density of mirrors per square millimeter would be lower towards the center than at the perimeter. Conversely, in a circular array for the corner distant position the density of mirrors per square millimeter would be higher towards the center and lower towards the perimeter.

Of course, DMD devices are currently designed to be produced on top of conventional, rectangular CMOS arrays using well developed rectangular addressing code. Accordingly, it may be more practical to approximate circular geometry, or to adapt array geometry to a known application such as a near corner configuration to project onto two walls and a ceiling, by abutting trapezoids. Again, there are more mirrors per square millimeter at the perimeter than towards the center. Conventional addressing code would be only need to be somewhat modified to achieve this embodiment.

Another way to project different densities of resolution to different portions of the image is with the software. Traditional digital keystoning correction, as described above, can widen a peripheral border by interpolating pixels to be added to the projected image. Alternatively or additionally, pixels may be subtracted from a more central or nearer portion of the image. Such code when applied to an array may be used to generate an image of uneven actual resolution that will appear, when obliquely projected, to have uniform resolution across both near and far portions of the viewed image.

An optimal solution may well combine modifications of both software and hardware.

Focus

Wide screen projection techniques are known. They include focussing correction for screens that are wide enough for the far edges to be out of focus if the center is in focus and visa versa. This is corrected by the use of amorphic lenses 80. Wide screen amorphic lenses are cylindrical lenses. Horizontal focus is made uniform over a wide range with a vertical axis cylindrical lens element added to the projection lens assembly. A bravais system attachment can also be used according to known techniques. Both can be used in the present invention. The cylindrical lens may be made asymmetrical to compensate for oblique projection.

Image Compensation for Oblique Projection

The data processing for compensation of the image areas to be obliquely projected is as follows. First a user sets up and aligns the projector(s) in the room in which they are to be used. Then the user adjusts the projector to the dimensions of the room, that is, the corners between the walls which are to be the viewing surfaces. This is done with an adjustment devices such as are known and used in keystone correction for normal projectors. First the "waist" will be aligned with the corner, and then the image areas will be compensated for the oblique projection distortion. These adjustments will be saved in a settings memory. When viewing is performed later, received image data will be converted to compensated image data according to the saved settings.

In the settings adjustment step, image areas will first be defined. First, the projector is positioned. A corner indicator or waist position indicator will be displayed on a test image. The projector can be repositioned if desired. Then, finer adjustment is had by moving the waist left or right. The waist, or image area divider, is a designation between columns to its left which are part of the left image area and columns to its right which are part of the right image area.

If a user requests image area re-definition left, the left most column of the right image area is re-assigned to the left area, and visa versa. On the next clock cycle, if image area re-definition left is still being requested, the next left most column of the right image area is re-assigned to the left area, and so on. This process may be applied to defining and re-defining two, three or more image areas, as for example three image areas corresponding to two walls and a ceiling.

A setting routine begins by determining if image area re-definition left is requested and if so executing it as described, and then determining if image area redefinition right is requested and if so executing it.

The next setting function is to establish the compensation necessary for each image area so that it fits the viewing surface and corrects oblique projection distortion. Again, the user requests compensation through known control modalities. If a routine determines that compensation is requested by the user in the first image area, an interpolation step is performed, to add pixels where needed. If on the next clock cycle the compensation is still being requested by the user in the first image area, the interpolation step is performed again, increasing the compensation until the user is satisfied and no further compensation is requested.

Interpolation is performed as follows. At a farthest column N pixels are interpolated according to any of a variety of known interpolations techniques. At a next farthest column N-1 pixels are interpolated. At a second next farthest column N-2 pixels are interpolated, and so forth.

If at the next clock cycle compensation is still being requested, N more pixels are interpolated at the farthest column again, and N-1 at the next farthest column are interpolated again and so forth. This proceeds until the user is satisfied and stops requesting compensation.

It will be apparent to those of skill in the art that compensation may be had by known pixel omission techniques as well without departing from the scope of the present invention. Likewise, compensation may proceed by rows rather than columns, as for compensating for wall and ceiling projection, or simply as a programming choice.

When the image areas have been defined and the image area compensations adjusted, the positions of the columns and interpolated pixels and/or the degree of interpolation for each column are saved to a settings memory. Further image projection will be through adjustment of the image according to the compensations settings memory.

The process of image projection is as follows. Image data is received into a buffer from a DVD, digital video, Internet or other download or storage medium or the like. This first buffer outputs image data to a compensation processor. The compensation processor is in operative communication with the settings memory, and is initialized by it. Once initialized, the compensation processor receives input image data and converts it. The conversion includes image area definition, a first image area compensation and at least one other image area compensation, such that these steps coordinate to project complimentary image portions on multiple viewing surfaces.

Compensation processing may be accelerated by dividing the image into sections symmetrical around an axis perpendicular to the corner, usually meaning the image is divided into quadrants. Compensation will be equal in degree in each quadrant, and so compensation once calculated for one quadrant may be rapidly reproduced for the other three quadrants by simply reversing the original calculation.

The coordinated image data is then output from the compensation processor to a second buffer and from the second buffer to the image source, which can be a DMD, LCD or other digital device, via which a light source projects a continuous image through a projection lens assembly onto plural viewing surfaces.

If brightness and/or resolution issues are to be addressed by digital processing, as for example by lengthening the time a DMD micromirror reflects a pixel in the image area that is projected to a more distant portion of the viewing surface, such processing may be added to the compensation processor algorithm. Alternatively, a second routine can be established to do this in a second processor.

It is contemplated that the present invention will project anywhere onto anything. Hence, projection may be had, by way of illustration and not limitation, on a wall, ceiling or floor, from the front or rear, onto dedicated screen located in home entertainment rooms, conference rooms, live theater sets, film theaters, classrooms, auditoriums, churches, outdoor venues, gaming environments, and onto cloth, paper, smoke, mirrors, glass, fold out screens or unfurling screens.

Projection may be onto screens of conventional projection screen material that direct a majority of projected light back towards the viewer, as opposed to diffusing it, in order to save brightness, resolution and power needs. Such reflective material may be incorporated into wallpaper or paint so that any room may compliment the apparatus and method of the present invention.

It is contemplated that the apparatus and method of the present invention may use any of the newer projection technologies, including but not limited to MEM, DLP, OLED, LC on Silicon, GLV or DMD. These smaller projectors compliment the system of the present invention. Conventional projector miniaturization such as, for example, the Plus U3-880, has reached a compactness of 9" by 7" by 2". Projection technology primarily intended for "flat screen" applications which avoid the bulkiness of CRTs have achieved even smaller dimensions. It is contemplated that the present invention in all embodiments may accommodate any projection technology, including but not limited to conventional projection, Digital Light Processing devices such as Digital Micromirror Devices, Liquid Crystal on Silicon, or Grating Light Valves and, if projection technology is developed therefrom, Organic Light Emitting Diode devices such as offered by Kodak, see, U.S. Pat. No. 5,688,551.

It is contemplated that the present invention in all embodiments may accommodate any video signal, including but not limited to NTSC, PAL, PAL-M, PAL-N, PAL60 and SECAM, as well as RGB signals such as XGA, SVGA, VGA UXGA and developing signal formats such as HDTV-10801 or HD B 15. It is contemplated that the present invention in all embodiments may accommodate any bit map format, including but not limited to BMP, RLE, ICO or CUR. Video signals may be translated from bit maps by video cards, conventional desktop or laptop computers, at the time of projection or before.

It is further contemplated that the present invention may display all Internet content, including web pages, web sites, formatting data, and data outside particular ISPs. It is further contemplated that the present invention may accommodate flash and streaming video cards.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A system for front projection of a continuous image onto at least two non-coplanar viewing surfaces comprising:
   a light source;
   a single image source;
   a projection lens assembly;
   said light source, single image source and projection lens assembly being disposed within a housing to project an image on a first viewing surface and at least one other viewing surface, said at least one other viewing surface being non-coplanar with said first viewing surface; and
   an image continuity component comprising:
      a first oblique projection compensator;
      at least one other oblique projection compensator;
      said oblique projection compensators being coordinated to project complimentary image portions.

2. The system of claim 1 wherein said image continuity component interpolates additional pixels into an image area for projection onto a viewing surface area that is more distant from the projection lens assembly.

3. The system of claim 1 wherein said image continuity component omits pixels into an image area for projection onto a viewing surface area that is more distant from the projection lens assembly.

4. The system of claim 1 wherein said image source is selected from the group consisting of a MEM, DLP, OLED, LC on Silicon, GLV or DMD.

5. The system of claim 1 wherein said image source projects image data transferred by a method selected from the group consisting of NTSC, PAL, PAL-M, PAL-N, PAL60 and SECAM.

6. The system of claim 1 wherein said image source projects image data transferred by a method selected from the group consisting of RGB, XGA, SVGA, VGA UXGA, HDTV-10801 or HD B 15.

7. The system of claim 1 wherein said continuous image is panoramic.

8. The system of claim 1 wherein said light source is an assembly comprising a light and an intensity controlling component selected from the group consisting of a shaping lens, an homogenizer, a variable homogenizer, a partial homogenizer, a light bar, a light bar with non-parallel sides, a light bar with variable refractive index and a gate.

9. The system of claim 1 wherein said light source is an assembly comprising a light and an intensity controlling component selected from the group consisting of an elliptical reflector, a paraboloid reflector, a spherical reflector, an asymmetrical elliptical reflector, an asymmetrical paraboloid reflector and en asymmetrical spherical reflector.

10. The system of claim 1 further comprising a second projector, said second projector projecting an image that Is continuous and coordinated with said continuous image of said first projector.

11. The system of claim 1 further comprising a projection lens assembly for each viewing surface.

12. The system of claim 1 wherein said projection lens assembly projects onto multiple viewing surfaces.

13. The system of claim 1 wherein said projection lens assembly includes an amorphic lens.

14. The system of claim 1 wherein said projection lens assembly includes an amorphic lens shaped to focus on multiple viewing surfaces.

15. The system of claim 1 wherein said image continuity component further comprises a light intensity modulator that increases the amount of light reflected by each of plurality of DMD micromirrors corresponding to image areas to be projected to farther portions of said viewing areas.

16. The system of claim 1 wherein said image source is a DMD, said DMD being non-rectangular in array.

17. The system of claim 1 wherein said compensation is by quadrants.

18. A system for front projection of a continuous image onto four adjoining walls and an adjoining ceiling comprising:
- a first projector and a second projector, each projector comprising;
  - a light source including a light, a reflector and a collimating element;
  - an image source, said image source being a digital micromirror device and a processor in operative communication with said micromirror device;
  - a projection lens assembly, with an amorphic element;
  - said light source, image source and projection lens assembly being disposed within a housing to project a continuous image on two adjoining walls and a portion of a ceiling;
- an image continuity component comprising:
  - a first oblique projection compensator for compensating oblique projection of a first image area onto one adjoining wall;
  - a second oblique projection compensator for compensating oblique projection of a second image area onto the other adjoining wall;
  - a third oblique projection compensator for compensating oblique projection of a third image area onto a portion of the ceiling;
- said first projector projecting onto a first wall, a second wall and a first ceiling portion, and said second projector projecting onto a third wall, a fourth wall and a second ceiling portion; and
- said oblique projection compensators of said first projector and said oblique projection compensators of said second projector being coordinated to project a continuous image on all four walls and the ceiling.

19. A method of projecting a continuous image onto a plurality of non-coplanar viewing surfaces comprising:
- receiving image data into a compensation processor;
- compensating the image data for oblique projection onto a first viewing surface and at least one other non-coplanar viewing surface; and
- obliquely projecting the image data on said viewing surfaces from a single lens such that a continuous image is perceptible.

* * * * *